UNITED STATES PATENT OFFICE.

CHARLES HARVESTA, OF NEW ORLEANS, LOUISIANA.

COMPOUND FOR DESTROYING VEGETATION.

SPECIFICATION forming part of Letters Patent No. 631,636, dated August 22, 1899.

Application filed February 24, 1899. Serial No. 706,721. (No specimens.)

*To all whom it may concern:*

Be it known that I, CHARLES HARVESTA, a citizen of the United States, residing at New Orleans, in the parish of Orleans and State of Louisiana, have invented new and useful Improvements in Compounds for Destroying Vegetation, of which the following is a specification.

My invention relates to a compound for destroying vegetation, and has for its object to provide an improved solution of certain chemicals that will exert a destructive effect on weeds, grasses, thistles, and undesirable vegetation when sprayed thereon.

My improved compound consists of the following-named ingredients in about the proportions stated, to wit: To each gallon of water I employ two drams each of sulfate of copper, cyanid of potash, saltpeter, and arsenic, (arsenious acid.) The sulfate of copper, cyanid of potash, and saltpeter should be dissolved in a sufficient quantity of water, with frequent stirring. The arsenic is to be separately dissolved in a sufficient quantity of water maintained at 212° Fahrenheit for about four hours, after which the solution should be allowed to stand until it has cooled. The solution of sulfate of copper, cyanid of potash, and saltpeter and the solution of arsenic are then to be mixed and a sufficient quantity of water added to make one gallon, and the compound is to be stirred thoroughly and is then ready for use.

For the purpose of effectually destroying weeds or noxious vegetation the liquid compound should be sprayed thereon by means of any suitable apparatus, such as a force-pump and hose provided with a spray-nozzle. The liquid should be applied until the undesirable vegetation is thoroughly moistened, so as to be penetrated throughout the leaves, stalks, and roots, according to circumstances, and as a result the vegetation so treated will be effectually destroyed.

What I claim as my invention is—

The herein-described liquid compound for destroying vegetation, consisting of sulfate of copper, cyanid of potash, saltpeter, arsenic and water, in about the proportions specified.

In testimony whereof I have hereunto set my hand in presence of two subscribing witnesses.

CHARLES HARVESTA.

Witnesses:
W. S. HERO,
JNO. J. WARD.